(12) United States Patent
Takashima

(10) Patent No.: US 6,352,045 B1
(45) Date of Patent: Mar. 5, 2002

(54) IMMOBILIZATION SYSTEM FOR WATERCRAFT

(75) Inventor: Sumihiro Takashima, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/670,004

(22) Filed: Sep. 25, 2000

(30) Foreign Application Priority Data

Sep. 24, 1999 (JP) .......................................... 11-271064

(51) Int. Cl.[7] ................................................ B63B 35/73
(52) U.S. Cl. ............................ 114/55.5; 440/1; 440/84; 180/272
(58) Field of Search ............................... 440/1, 84, 85, 440/87; 114/55.5; 182/271, 272

(56) References Cited

U.S. PATENT DOCUMENTS

| | | |
|---|---|---|
| 4,196,418 A | 4/1980 | Kip et al. |
| 4,471,345 A | 9/1984 | Barrett, Jr. |
| 4,850,906 A | 7/1989 | Kanno |
| 4,941,854 A | 7/1990 | Takahashi et al. |
| 4,949,684 A | 8/1990 | Gohara |
| 5,171,171 A | 12/1992 | Tani |
| 5,593,330 A * | 1/1997 | Kobayashi .................. 440/84 |
| 5,873,322 A | 2/1999 | Koyanagi |
| 5,952,940 A | 9/1999 | Matsumoto |
| 6,024,068 A | 2/2000 | Nakase et al. |
| 6,077,133 A * | 6/2000 | Kojima et al. ................. 440/1 |

OTHER PUBLICATIONS

Sea Doo Shop Manual, Bombardier, Inc., 1996, Section 07, Sub–section 06 (Digitally Encoded Security System).

* cited by examiner

Primary Examiner—Jesus D. Sotelo
(74) Attorney, Agent, or Firm—Knobbe, Martens, Olson & Bear, LLP

(57) ABSTRACT

An immobilization system for watercraft includes a transponder mounted within a lanyard clip and a communication device mounted to be in the vicinity of the trasponder when the lanyard member is engaged with the kill switch assembly. The transponder emits a security code which is received by the communication device and is compared to a predetermined authorized security code. If the transponder does not include the correct security code, the engine will not start or will be killed.

10 Claims, 7 Drawing Sheets

IMMOBILIZATION SYSTEM FOR WATERCRAFT

PRIORITY INFORMATION

This application is based on and claims priority to Japanese Patent Application No. 11-271,064, filed Sep. 24, 1999.

BACKGROUND OF THE INVENTION

1. Field of the Invention

This application is directed to an immobilization system for watercraft. In particular, the present invention is directed to an antitheft device having a transponder embedded in a lanyard.

2. Description of Related Art

The popularity of personal watercraft has increased dramatically in recent years. Unfortunately, this increase in popularity has also brought about an increase in personal watercraft theft.

In order to protect against personal watercraft theft, personal watercraft of the past have included a number of antitheft devices. One of these devices is a lanyard switch which also functions as an emergency shutoff device. The lanyard switch includes a stop switch that protrudes from a handlebar assembly and claw-shaped lanyard lock plate that engages the stop switch for allowing an ignition system of an engine to operate. The lock plate includes a cord and a wrist strap for attaching the lock plate to an operator's wrist or a clip for attaching the lock plate to the operator's clothing so that if the operator falls off the watercraft during operation, the lock plate will be disengaged from the stop switch so as to kill the engine.

With reference to FIGS. 1 and 2, a conventional lanyard 10 is illustrated therein. As shown in FIG. 1, a personal watercraft 12 includes a steering assembly 14 having a pair of grips 16 configured to be grasped by a user 18. The user 18 rotates the steering assembly 14 in order to steer the watercraft 12.

Adjacent one of the grips 16, a kill switch 20 is mounted to the steering assembly 14 and is configured to selectively kill the operation of an engine powering the watercraft 12. The kill switch 20 is operated by the lanyard 10.

As shown in FIG. 2, the lanyard 10 includes a kill switch button 22 that is spring loaded and mounted in a kill switch assembly 24. The kill switch button 22 is spring biased towards a kill position. A lanyard locking plate 26 is configured to fit between a lower surface of the kill switch button 22 and an outer surface of the kill switch assembly 24. The lanyard plate 26 is also attached to a tether 28 which connects the lanyard plate 26 to a wristband 30, as viewed in FIG. 1. Thus, during operation, if a user 18 falls from the watercraft 12, the tether 28 pulls the lanyard plate 26 away from the kill switch assembly 24, thus allowing the kill button 22 to move inward towards a kill position, thus killing the engine and stopping the watercraft 12. Typically, the kill switch assembly 24 also includes an additional kill button 32 which the user 18 can activate at any time to kill the engine.

The lanyard switch provides some antitheft protection because the lock plate is required to engage the stop switch in order to start and operate the engine. The problem with using a lanyard switch as the only means of antitheft protection is that other plates and mechanisms can be substituted for the lock plate thus allowing the engine to start and operate without using the lock plate originally supplied with the watercraft. As a result, the lanyard switch alone does not provide significant antitheft protection.

Other conventional personal watercraft has been provided with an ignition key. This key and its corresponding lock cylinder allowed the starter motor, which starts the engine, to be activated by a start switch located on the handlebar assembly of the watercraft. The key helped to protect against theft because without it, the watercraft engine is virtually impossible to start.

One drawback of this type of antitheft ignition key is that the operator is required to carry the ignition key as well as the lanyard safety device. Watercraft users typically wear a bathing suit or a wetsuit which do not usually include reliable means for carrying such a key. Thus, if the operator loses or forgets the key, the watercraft is completely inoperable.

Another type of conventional device that is used has an antitheft device is a lanyard having a unique digital circuit mounted in the lanyard which makes electrical contact with a terminal provided on the handlebar assembly of the watercraft during operation. For example, with reference to FIGS. 3 and 4, a conventional lanyard cap 34 is illustrated therein. As shown in FIG. 3, the lanyard cap 34 includes a cap-shaped outer housing 36 and a digital circuit 38. The digital circuit 38 includes two electrical contacts 40, 42 and a digital password portion 44.

The lanyard cap 34 is made from molded plastic and the circuit 38 is embedded within the plastic forming the cap 36. The contacts 40, 42 are left exposed on their inner surfaces. Additionally, a lower surface 46 of the digital password portion is also left exposed.

The watercraft using lanyard cap 34 includes a lanyard terminal on a kill switch assembly similar to the kill switch assembly 24 illustrated in FIG. 2. When a user wishes to start the engine of such a watercraft, the user places the lanyard cap 34 onto the terminal at which time the contacts 40, 42 of the circuit 38 makes contact with corresponding terminals on the lanyard terminal. An engine controller of the watercraft communicates with the digital password portion 44 and determines whether the proper password is stored therein. If the proper password is not stored therein, the engine controller will not allow the watercraft engine to be started. Additionally, if the lanyard cap 34 is removed during operation of the watercraft, the engine will be killed.

SUMMARY OF THE INVENTION

According to one aspect of the present invention, an immobilization system for a watercraft includes a lanyard system in which a lanyard member includes a transponder embedded therein without having a plurality of electrical contacts exposed on the outer surface of the lanyard member. Additionally, the system includes a communication device which communicates with the transponder to determine if the transponder includes a predetermined security code. By constructing the lanyard member such that a plurality of electrical contacts are not left exposed on the outer surface of the lanyard member, the immobilization system of the present invention is more protected from the corrosive effects of water, such as a body of water in which a watercraft operates, yet provides an antitheft function without requiring the user to carry additional hardware.

Further aspects, features, and advantages of the present invention will become apparent from the detailed description of the preferred embodiments which follow.

Figure 5:
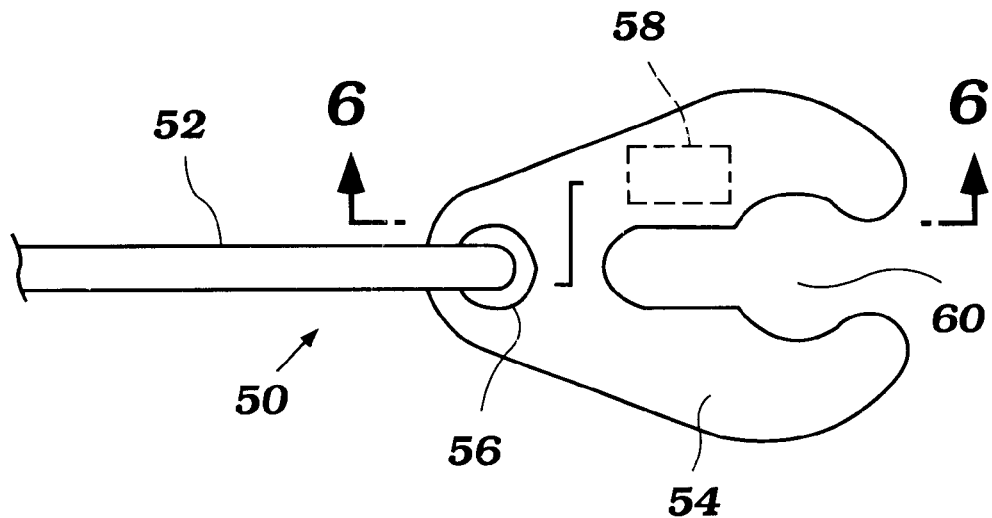
Figure 6:
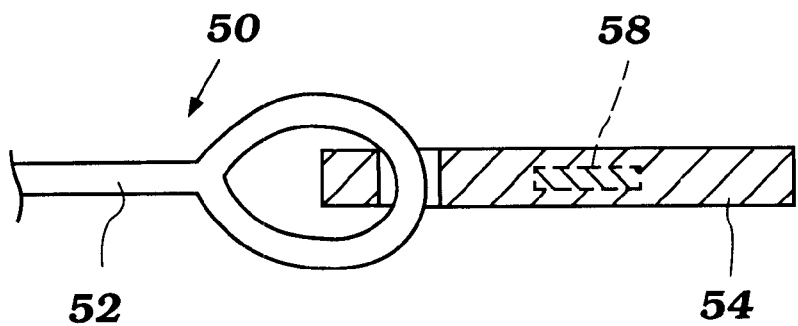
Figure 7:
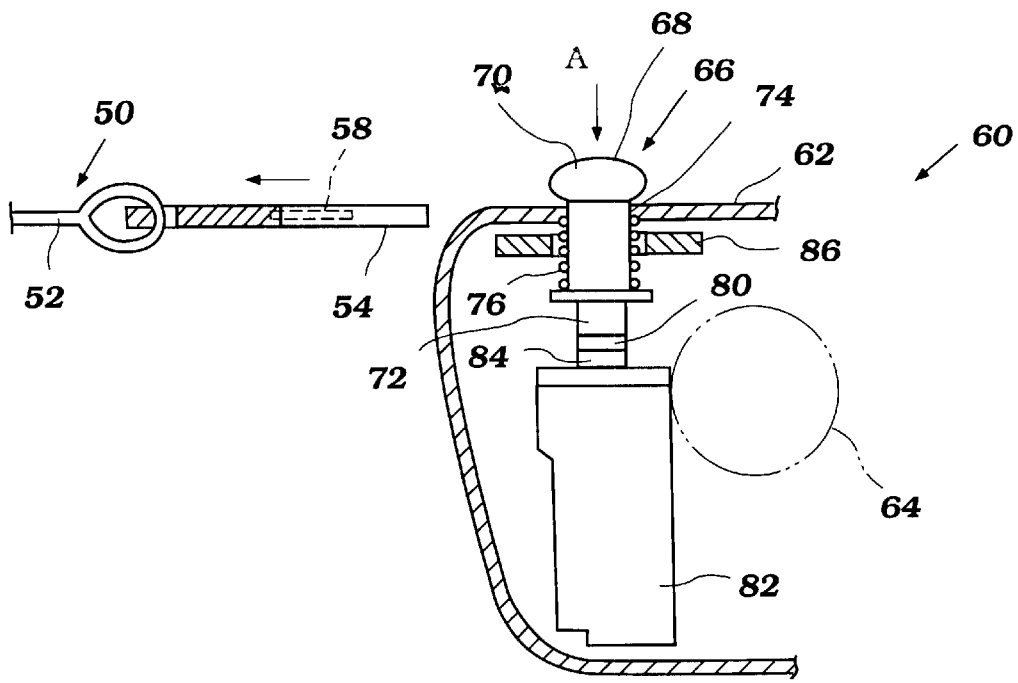
Figure 8:
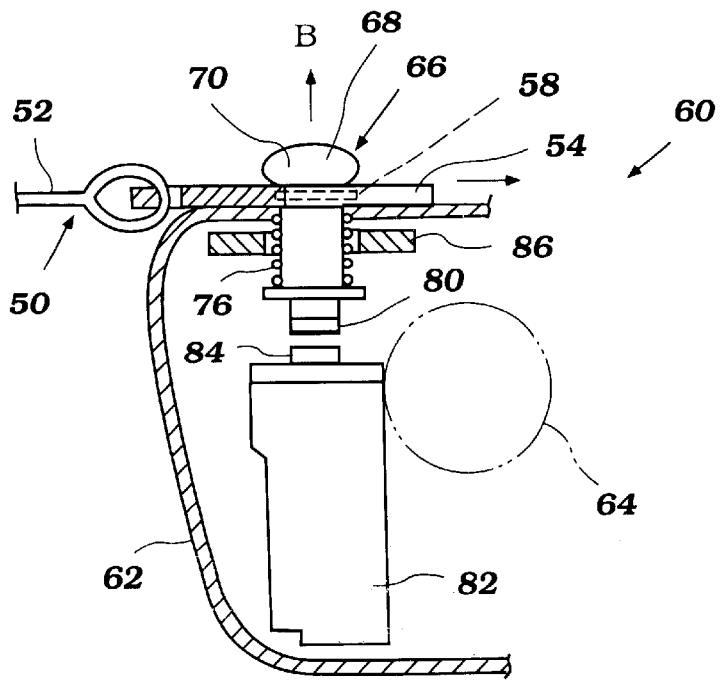

The features mentioned in the Summary of the Invention, as well as other features of the invention, will now be described with reference to the drawings of the preferred embodiment of the present immobilization system for a watercraft. The illustrated embodiment of the immobilization system is intended to illustrate, the invention. The drawings contain the following figures:

FIG. 5 is a top plan view of a lanyard member having a transponder (shown in phantom, disposed therein, constructed in accordance with one aspect of the present invention;

FIG. 6 is a cross-sectional view of the lanyard member illustrated in FIG. 5, taken along line 6—6;

FIG. 7 is a sectional view of a kill switch assembly mounted to a handlebar assembly (shown in phantom) constructed in accordance with another aspect of the present invention, and including a sectional view of the lanyard member illustrated in FIGS. 5 and 6 positioned in a state disengaged from the kill switch assembly;

FIG. 8 is a sectional view of the kill switch assembly illustrated in FIG. 7 with the lanyard member engaged with the kill switch assembly.

Figure 9:
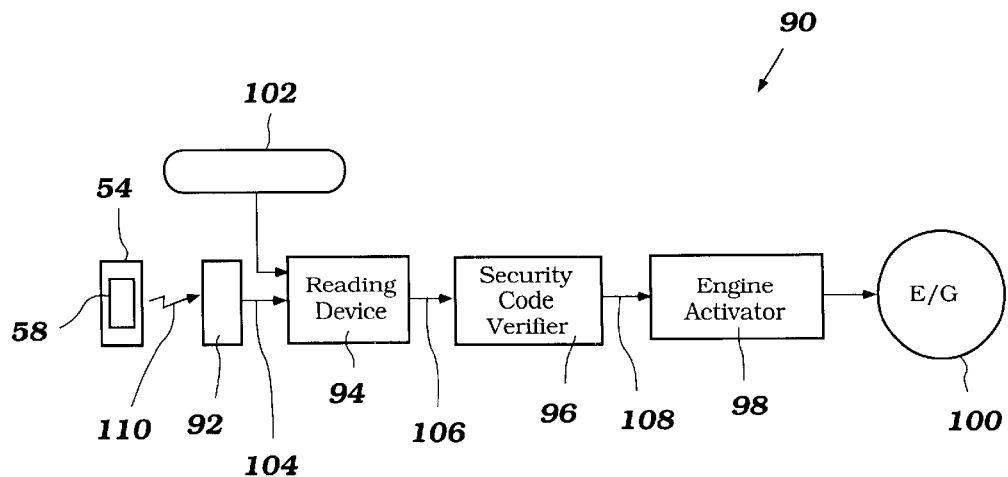
Figure 10:
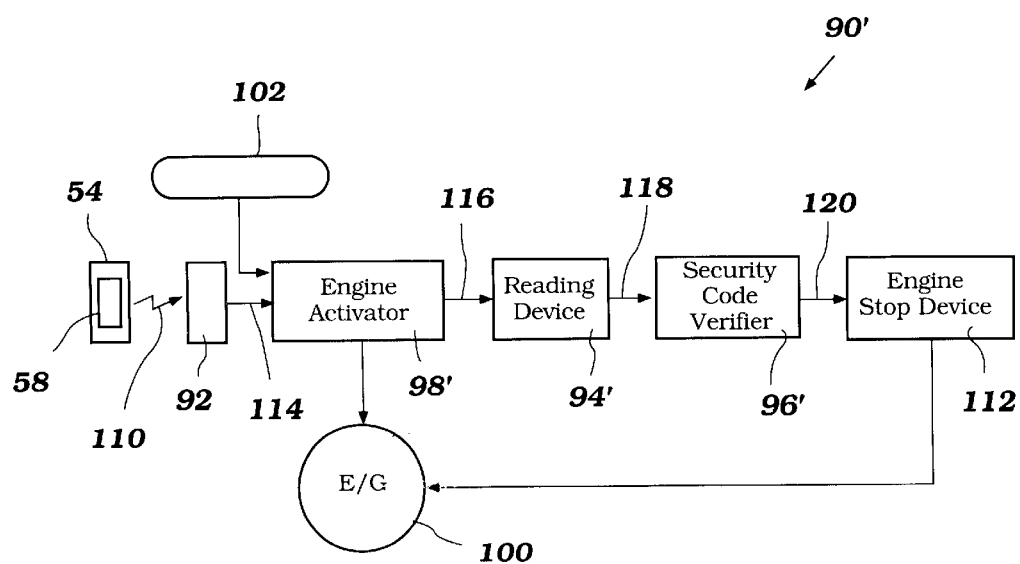
Figure 11:
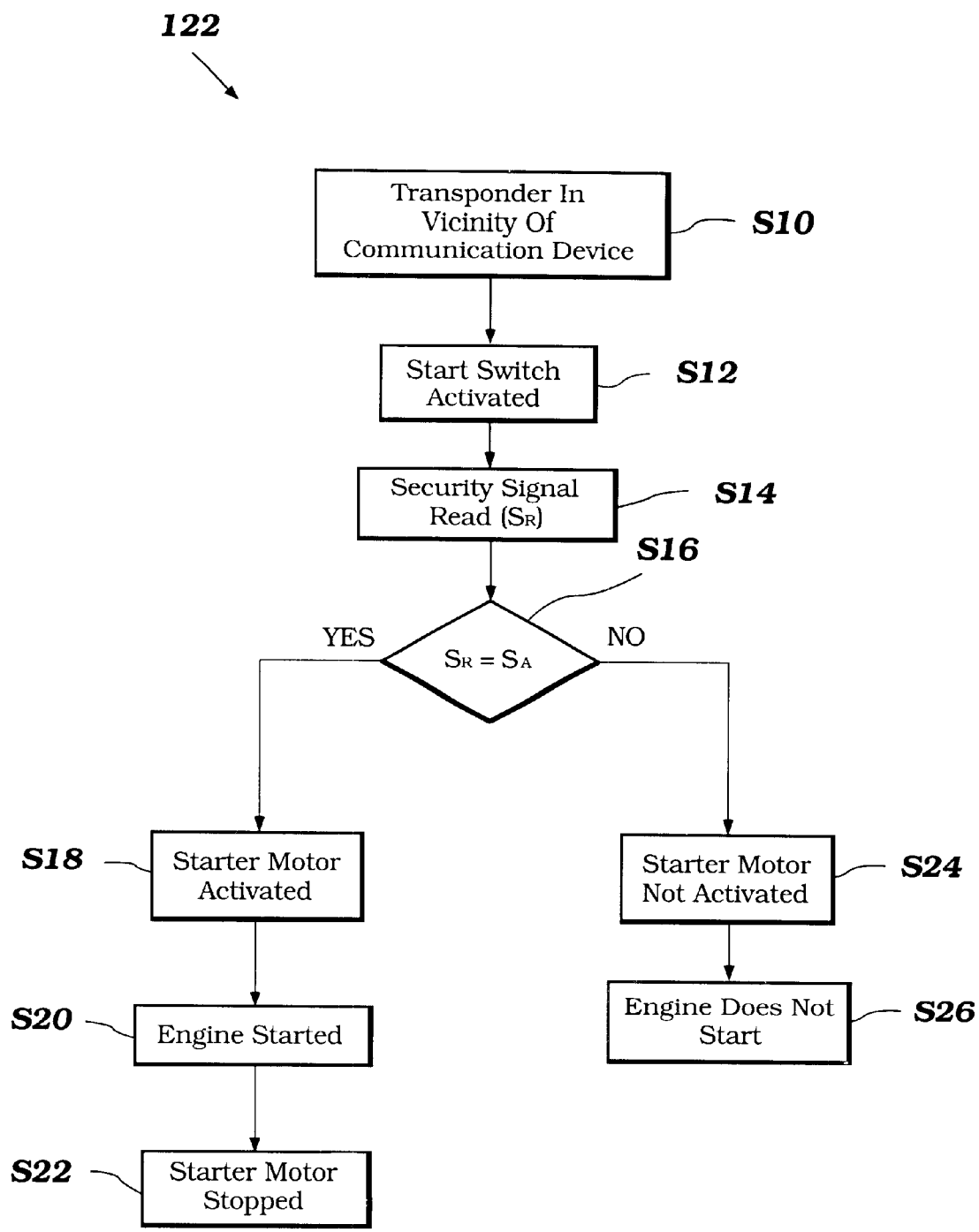
Figure 12:
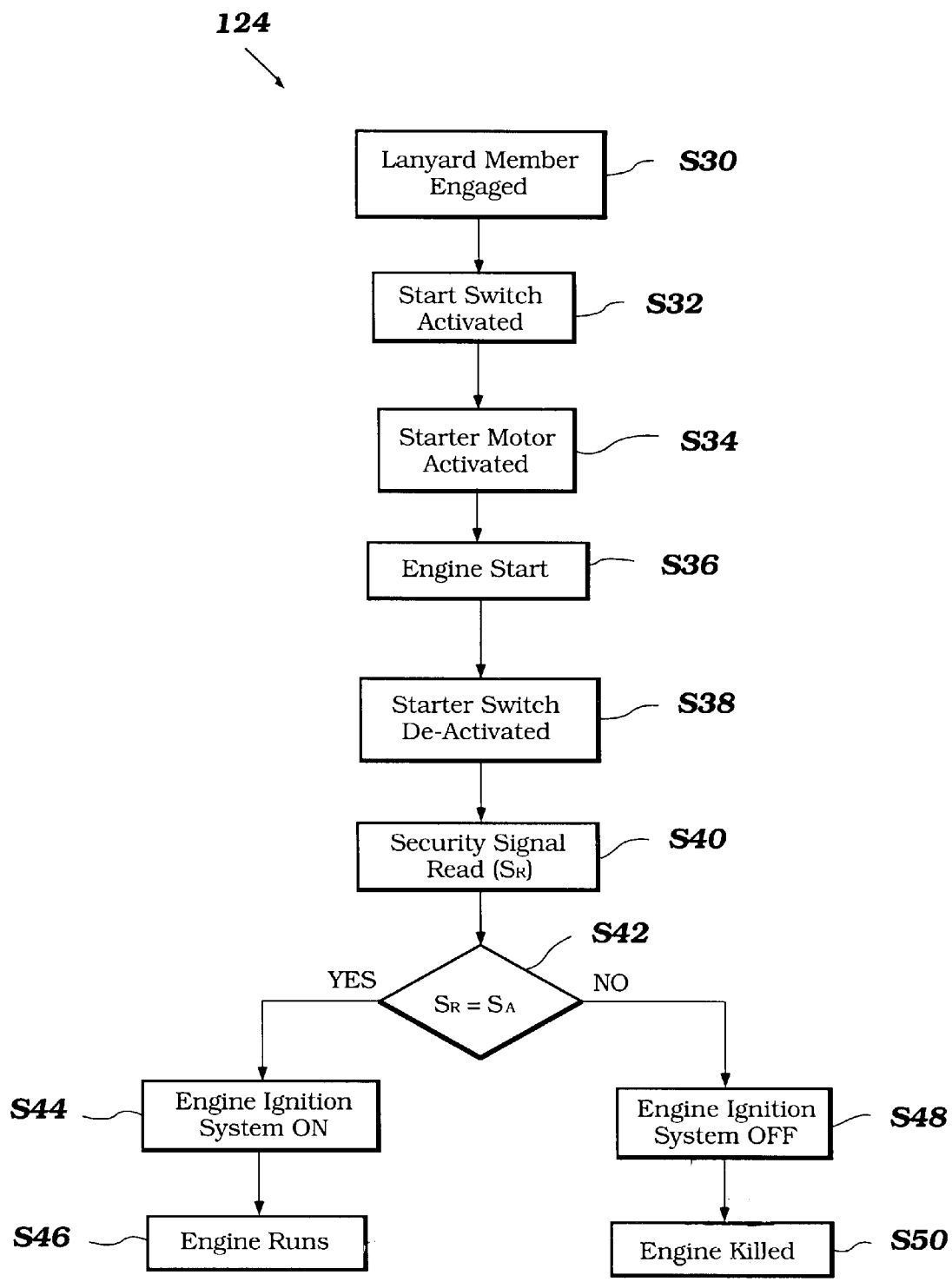

FIG. 9 is a block diagram illustrated a preferred embodiment of an immobilization system constructed in accordance with a further aspect of the present invention;

FIG. 10 is a modification of the immobilization system illustrated in FIG. 9;

FIG. 11 is a flowchart illustrating a control subroutine in accordance with another aspect of the present invention;

FIG. 12 is a flowchart illustrating a modification of the control subroutine illustrated in FIG. 11.

DETAILED DESCRIPTION OF THE PREFERRED EMBODIMENTS OF THE INVENTION

The present invention is directed to an immobilization system for a watercraft. In general, the immobilization system includes a lanyard assembly which functions as a kill switch for an engine of a watercraft when a user of the watercraft moves their arm sufficiently far from the engine controls to activate the lanyard. Those of skill in the art will appreciate that the invention has particular utility for a personal watercraft but can also be used or adapted for use in a variety of other settings, for example, without limitation, open hull boats and outboard motors.

With reference to FIGS. 5 and 6, a lanyard assembly 50 constructed in accordance with one aspect of the present invention is illustrated therein. The lanyard assembly 50 includes a tether 52 (shown partially) connected to a lanyard member 54.

The lanyard member 54 includes an aperture 56 through which the tether 52 passes so as to reliably attach the tether 52 to the lanyard member 54. The other end of the tether 52 (not shown) includes a wrist strap configured to releasably engage a wrist of a user, or a clip configured to releasably engage the clothing or a life jacket of a user. Additionally, the tether 52 may includes a float which prevents the lanyard assembly 50 from sinking if it is dropped in water.

The lanyard assembly 50 also includes a transponder 58 disposed within the lanyard member 54. In the illustrated embodiment, the lanyard member 54 is in the form of a plate having a contoured groove 60 defined therein. The contoured groove 60 is configured to releaseably engage a kill switch assembly, described in more detail below. As shown in FIGS. 5 and 6, the transponder 58 is disposed within the lanyard member 54 such that a plurality of electrical contacts communicating with the transponder 58 are not exposed on the outer surface of the lanyard member 54. Rather, the transponder 58 is embedded within the lanyard member 54 so as to be completely surrounded by the material forming the lanyard member 54.

In a preferred embodiment, lanyard member 54 is formed from molded plastic or resin. In this mode, the transponder 58 is insert molded within the lanyard member 54. Thus, the transponder 58 is sealed within the lanyard member 54 and is protected from, contact with environmental elements, such as for example, water.

The transponder 58 is of a type which is well known in the art. The transponder 58 is configured to emit a signal upon receiving a signal from an outside source. In the presently preferred embodiment, the transponder 58 is configured to become excited and resonate when it receives a predetermined interrogation signal. The resulting resonance of the transponder 58 results in a security signal to be emitted from the transponder 58. Preferably, the transponder 58 is configured to emit a unique security signal in response to the predetermined interrogation signal. This type of transponder has no internal power supply. Rather, the transponder 58 is excited by the interrogation signal. Such as transponder is well known in the art. For example, U.S. Pat. No. 4,196,418 issued to Kip et al., issued Apr. 1, 1980, discloses a plate for an identification system which includes a circuit configured to generate a response signal when excited by an outside signal. Thus, a further description is not necessary for one of ordinary skill in the art to make and use the invention as disclosed herein.

As noted above, the transponder 58 is configured to emit a unique response signal in response to an outside signal received by the tansponder 58. For example, the transponder 58 can be configured to emit a unique signal in response to a predetermined interrogation signal, where the unique security signal corresponds to a unique security code. In a presently preferred embodiment, an outside signal is generated from a kill switch assembly 60 mounted on a handlebar of a watercraft.

Figure 1:
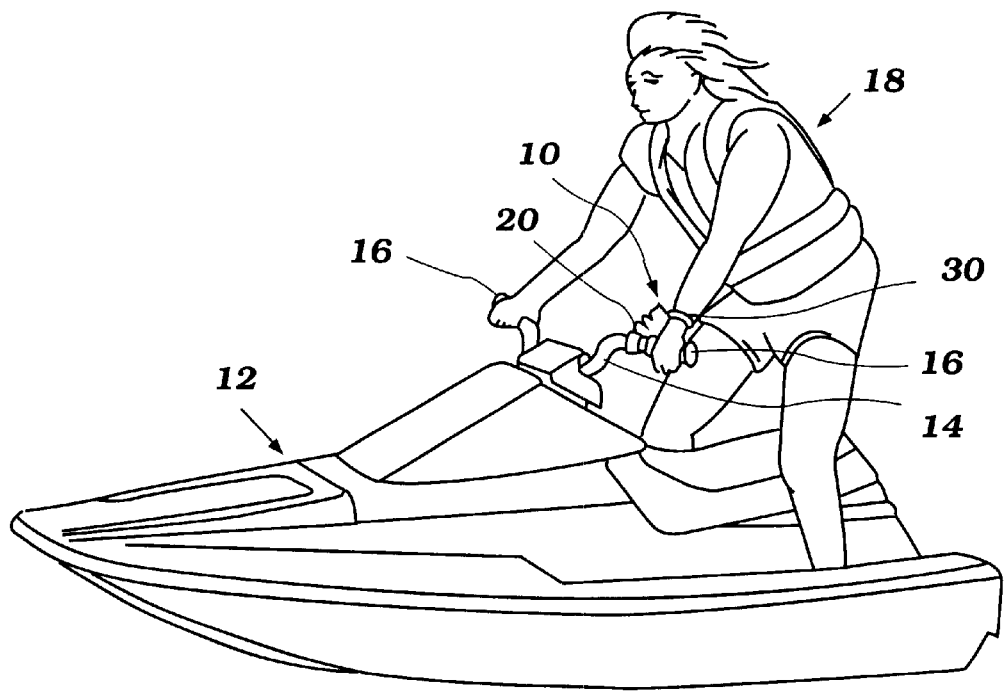
FIG. 1 is a front, left, and top perspective view of a user riding a known personal watercraft.
Figure 2:
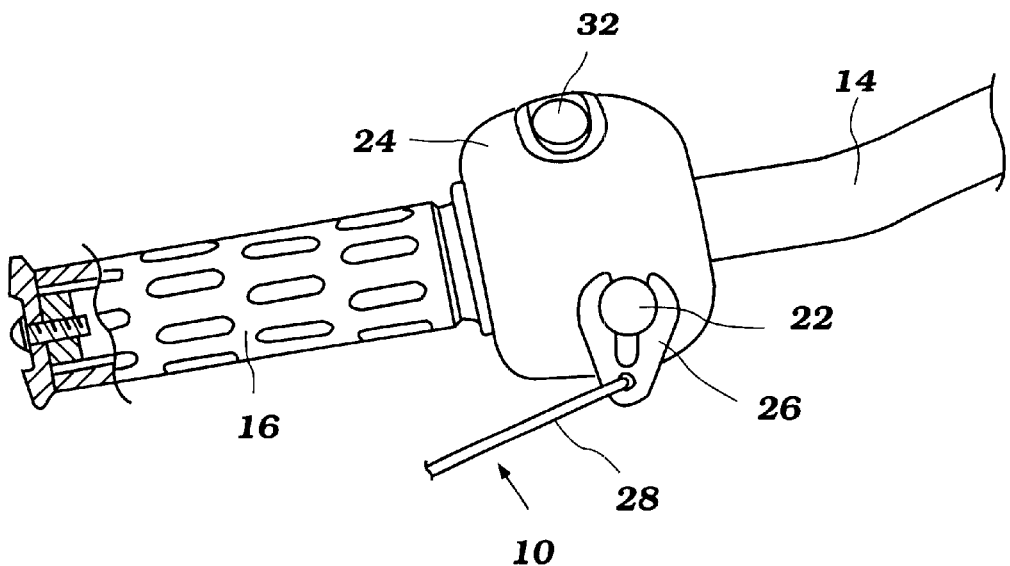
FIG. 2 is a top plan view of a port side portion of a handlebar assembly included on the watercraft illustrated in FIG. 1.
Figure 3:
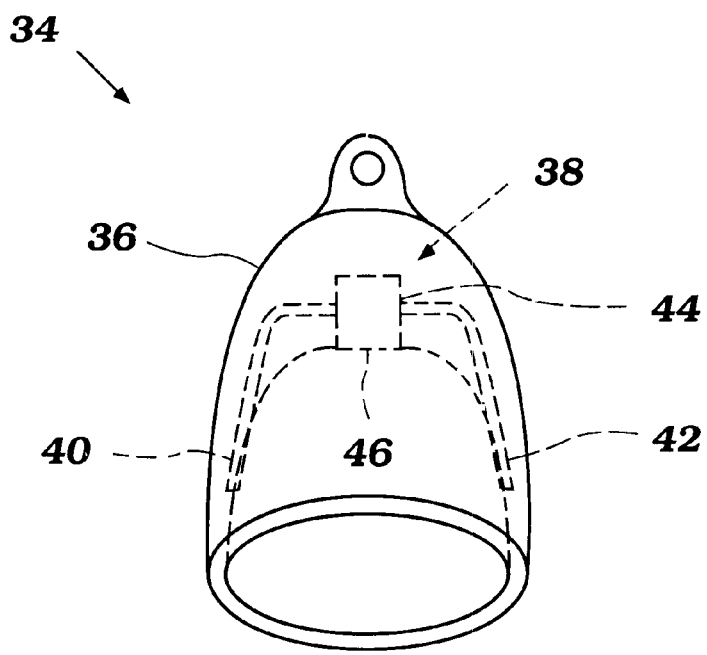
FIG. 3 is a bottom, front, and left-side perspective view of a lanyard cap of the known lanyard having a password portion (shown in phantom) disposed within the lanyard cap.
Figure 4:
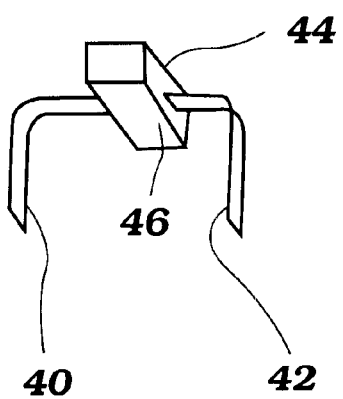
FIG. 4 is a bottom, front, and left-side perspective view of the password portion of the lanyard cap illustrated in FIG. 3.

With reference to FIGS. 7 and 8, the kill switch assembly 60 includes an outer housing 62 (shown in section) which is mounted to a mounting portion 64 of an associated watercraft (not shown). Preferably, the housing 62 is configured to provide a substantially waterproof environment for components mounted therein. The mounting portion 64 could form part of a conventional personal watercraft, such as the handlebar assembly 14 of the watercraft 10 illustrated in FIG. 1. Alternatively, the mounting portion 64 can comprise a portion of an outboard motor or an operator's area of an open hull boat.

As shown in FIGS. 7 and 8, the kill switch assembly 60 includes a plunger assembly 66 supported thereby. The plunger assembly 66 includes a plunger member 68 having an enlarged head 70 and a shaft portion 72. The enlarged head 70 is disposed on an outside of the housing 62. The shaft portion extends through an aperture 74 defined in the housing 62. A spring 76 biases the plunger 72 towards a retracted state, in the direction of arrow A. The plunger 72 also includes a contact 80 at a lower end thereof.

The kill switch assembly 60 also includes a kill switch 82 contained therein. A contact 84 is disposed at the upper end of the switch 82. It is to be noted that the terms "upper" and "lower," of course, depend on the chosen orientation of the kill switch assembly 60 and are used here to simplify the description. Likewise, terms of orientation, such as "above", "below", "horizontal", and "vertical" are used in the context of the illustrated embodiment; however, because other orientations are possible, the present invention should not be limited to the illustrated orientation. Those skilled in the art will appreciate that other orientations of the kill switch assembly 60 also are possible.

The configuration of the shaft portion 72 and the enlarged head 70 of the plunger 68 allows the plunger 68 to move between a closed position (FIG. 7), and an open position (FIG. 8). As shown in FIG. 7, when the lanyard assembly 50 is not engaged with the plunger assembly 68, the spring 76 biases the plunger 68 in the direction of arrow A so as to bring contact 80 and contact 84 together thereby activating the kill switch 82.

With reference to FIG. 8, the lanyard assembly 50 can be engaged with the plunger assembly 66 so as to deactivate the kill switch 82. For example, the lanyard member 54 can be inserted between the enlarged head 70 and an upper surface of the housing 62, moving the plunger 68 in the direction of arrow B, so as to maintain the plunger 68 in an open position, i.e., such that the contacts 80 and 84 are spaced from one another. In this position, the kill switch 82 is deactivated.

The kill switch 82 can be constructed in any known manner. For example, the kill switch 82 can comprise a physical switch positioned in series between a power source and an electronic engine control device, such as an electronic control unit (ECU) or an ignition unit (not shown). As such, when the kill switch 82 is activated, i.e., when the plunger 68 is in the closed position, the kill switch 82 opens and thus prevents electrical power from being delivered to the ECU or the ignition, thus preventing operation of an associated engine. Conversely, when the plunger 68 is in the open position, i.e., as shown in FIG. 8, the kill switch 82 is closed which allows a power source to communicate with the ECU and/or the ignition system. Such a kill switch 82 is well known in the art, and thus, a further description of the kill switch 82 is not necessary for one of ordinary skill in the art to make and use the invention as described herein.

In accordance with a further aspect of the present invention, a communication device 86 is also disposed within the kill switch assembly 60, so as to be positioned within the vicinity of the transponder 58 when the lanyard member 54 is engaged with the plunger assembly 66. The communication device 86 is positioned sufficiently close to the plunger assembly 66 such that when the lanyard member 54 is engaged with the plunger assembly 66, the transponder 58 can communicate with the communication device 86. In the illustrated embodiment, the communication device 86 is positioned directly beneath the transponder 58 when the lanyard member 54 is disposed between the enlarged head 70 in the upper surface of the housing 62.

In the illustrated embodiment, the communication device 86 is constructed of an antenna coil. Driver electronics (not shown) controls the signals emitted by the communication device 86. For example, the driver electronics can be configured to cause the communication device 86 to emit an interrogation signal which is received by the transponder 58. As noted above, the transponder 58 can be configured to become excited or resonate in response to the interrogation signal and to emit a response signal. Preferably, the transponder 58 is configured to emit a security signal that corresponds to a unique security code. The communication device 86 can also be configured to receive the security signal from the transponder 58. The internal construction of the transponder 58 and the associated driver electronics for causing the transmitter to emit an interrogation signal and receive a response signal from the transponder 58 is well known in the art. Thus, a further detailed description of the construction of the transponder 58 and the communication device 86 is not necessary for one of ordinary skill in the art to make and use the invention as disclosed herein.

As noted above, the housing 62 preferably forms a substantially waterproof seal around the communication device 86 and the kill switch 82. Thus, the communication device 86 can communicate with the transponder 58 without having direct electrical coupling therebetween. Rather, the tranponder 58 can remain completely embedded in the material forming the lanyard member 54 and the communication device 86 can remain sealed within the housing 62, and thus protected from the corrosive effects of water while providing antitheft protection for the vehicle to which the kill switch assembly 60 is mounted.

With reference to FIG. 9, an immobilization system 90 constructed in accordance with yet another aspect of the present invention is illustrated therein. The immobilization system 90 includes a lanyard member such as the lanyard member 54 having a transponder 58 included therewith, a communication device 92, a reading device 94, a security code verification device 96, and an engine activation control device 98.

As shown in FIG. 9, the immobilization system 90 is connected to an engine 100. The engine 100 may be associated with a personal watercraft. For example, the engine 100 can be in the form of an internal combustion engine disposed within an engine compartment of a personal watercraft, such as the personal watercraft 10 illustrated in FIG. 1. Alternatively, the engine 100 may be disposed within the engine compartment of an open hull or a small jet boat. Additionally, the engine 100 may be included in the powerhead of an outboard motor. As shown in FIG. 9, a start switch 102 is connected to the reading device 94.

In the illustrated embodiment, the communication device 92 can comprise the communication device 86. As noted above, the communication device 86 can be in the form of an antenna coil which can receive a security signal from the transponder 58.

The communication device 92 is configured to receive a security signal from the transponder 58. Preferably, the communication device is configured to generate and transmit an interrogation signal. The communication device 92 can transmit the interrogation signal through a coil antenna such as the illustrated embodiment of the commununication device 86 (FIG. 7). The interrogation signal is configured to excite the transponder 58, causing the transponder 58 to emit a security signal stored therein. The communication device 92 is also configured to receive the security signal and transfer the security signal to the reading device 94 via a communication line 104.

The reading device 94 is configured to receive the security signal from the communication device 92. The reading device 94 is also configured to convert the security signal to a security code corresponding to the security signal. The reading device 94 can be constructed in any known manner. As noted above, driving electronics for a communication device such as the communication device 92 are well known in the art. Thus, a further detailed description of the construction of the reading device 94 is not necessary for one of ordinary skill in the art to make and use the invention as disclosed herein.

The security code verifier 96 is connected to the reading device 94 via a communication line 106. The security code verifier 96 is configured to receive the security code from the reading device 94 and to compare the security code to a predetermined authorized security code. For example, the security code verifier 96 can be constructed of a memory having at least one authorized security code stored therein and a comparator for comparing the security code received from the reading device 94 to the authorized security code stored in the memory. Preferably, the security code verifier 96 is also programmable such that if a user wishes to allow another transponder configured to emit a different unique security signal, to operate a particular watercraft, the user can program the security code verifier 96 accept security code corresponding to the security signal emitted from the additional transponder. The security code verifier 96 is also configured to output a signal to the engine activator device 98 so as to either activate or deactivate the engine activator device 98 based on whether an authorized security code was received by the security code verifier 96.

The engine activator device 98 is connected to the security code verifier via a communication line 108. The engine activator device 98 is configured to control the operation of the engine 100. For example, the engine activator device 98 can control any one of a number of electronic systems related to engine operation. For example, the engine activator device 98 can comprise a switch controlling the flow of electrical energy through the ignition system. With this construction, the engine activator device can switch between an activated state in which the ignition system of the engine 100 is activated and a deactivated state in which the ignition system of the engine 100 is grounded, thus preventing the flow of energy to ignition devices such as spark plugs (not shown).

Alternatively, or in addition, the engine activator device 98 can control the flow of electric power to a starter motor of the engine 100. For example, the engine activator device 98 can be configured to switch between a first state in which electrical energy is allowed to flow to the starter motor of the engine 100 and the second state in which electric energy is not allowed to flow to the starter motor.

Alternatively or in addition, the engine activator device could be configured to activate or deactivate a fuel supply system for the engine 100. For example, the engine 100 could be supplied with a fuel injection system which is electronically controlled. In this mode, the engine activation device 98 can switch between a first state in which the fuel injection system is allowed to operate and a second state in which the fuel injection system is prevented from operating. One of ordinary skill in the art can understand that numerous other configurations of the engine activator device 98 can be used for allowing or preventing the operation of the engine 100.

The start switch 102 can be in the form of any known start switch. For example, a conventional start switch could be mounted to a handlebar assembly of a personal watercraft, such as the handlebar assembly 14 of the watercraft 10 illustrated in FIG. 1.

In operation, the immobilization system 90 will allow or prevent the operation of the engine 100 depending on the security code stored in the transponder 58. For example, with the lanyard member 54 installed in the vicinity of the communication device 92, a user can push the start button 102 which activates the reading device. The reading device causes the transponder 58 to emit a security signal. For example, the reading device, and/or other driver electronics (not shown), can cause the communication device to emit an interrogation signal to which the transponder is responsive. The transponder 58 then emits a security signal 110 in response to the interrogation signal. The security signal 110 is received by the communication device 92 which transfers the signal to the reading device 94 via the communication line 104. The reading device 94 converts the security signal to a security code. The security signal, which can be an analog or a digital signal, can be converted to, for example but without limitation, a binary or alphanumeric code. The reading device 94 then transfers the security code to the security code verifier 96 via the communication line 106. The security code verifier 96 compares the security code received from the reading device 94 with a predetermined authorized security code. The security code verifier 96 compares the security code received from the reading device 94 with the predetermined authorized security code and signals the engine activator device 98 via the communication line 108.

If the security code verifier 96 signals the engine activator device 98 that a proper security code has been received, the engine activator device 98 can allow the engine 100 to operate. For example, as noted above, the engine activator device 98 can be used to control at least one of a starter motor, an ignition system, or a fuel injection system of the engine 100.

With reference to FIG. 10, a modification of the immobilization system 90 is illustrated therein. As shown in FIG. 10, an immobilization system 90' can include an engine activator device 98', a reading device 94' and a security code verifier 96' that can be constructed in accordance with the description set forth above with respect to the engine activator device 98, the reading device 94, and the security code verifier 96, respectively.

In the present modification, the immobilization 90' also includes an engine stop device 112. The engine stop device can be configured as a conventional kill switch which is well known in the art. For example, the engine stop device 112 can be in the form of a physical switch that can switch between two states. In a first state, the engine stop device 112 allows electrical energy to flow through the ignition system of the engine 100 in the normal manner. However, in a second state, the engine stop device 112 grounds the ignition system, thus preventing sufficient electrical energy to reach spark plugs of the engine 100. However, one of ordinary skill in the art can understand that the engine stop device 112 can be constructed in any known manner for killing the operation of an engine such as the engine 100.

In the immobilization system 90', the start switch 102 and the communication device 92 communicate directly with the engine activator 98'. As shown in FIG. 10, the communication device 92 communicates with the engine activator device 98' via a communication line 114. The engine activator device 98' communicates with the reading device 94' via communication line 116. The reading device 94' in turn, communicates with the security code verifier 96' via a communication line 118. Finally, the security code verifier 96' communicates with the engine stop device 112 via a communication line 120.

In operation, with the lanyard member 54 positioned in the vicinity of the communication device 92, a user 102 can activate the start switch 102 which activates the engine actuator 98' and starts the engine 100. Prior to the activation of the start switch 102 or substantially simultaneously therewith, the communication device 92 receives the security signal 110 from the transponder 58. In the illustrated embodiment, the communication device 92 transfers the security signal to the engine activator device 98' which transfers the security signal to the reading device 94' via the communication line 116. As noted above with respect to the reading device 94, the reading device 94' converts the security signal to security code and transfers the security code to the security code verifier 96' via the communication line 118.

As noted above with respect to the security code verifier 96, the security code verifier 96' compares the security code received from the reading device 94' with a predetermined authorized security code. If the security code verifier 96' verifies that an authorized security code was received from the reading device 96', the security code verifier 96' signals the engine stop device 112, via the communication line 120, to allow the engine 100 to operate.

For example, the security code verifier 96' could signal the engine stop device 112 to allow electrical to flow through the ignition system of the engine 100. However, if the security code verifier 96' determines that an authorized security was not received through the reading device 96', the security code verifier 96' can signal the engine stop device 112 to kill the engine 100. For example, the engine stop device 112 could ground the ignition system, thereby killing the engine 100.

With reference to FIG. 11, a control subroutine 122 composed in accordance with another aspect of the invention is illustrated therein. As shown in FIG. 11, subroutine 122 is initiated after a step S10 in which the transponder 58 is positioned in the vicinity of the communication device 92 and after a step S12 in which a start switch, such as the start switch 102, is activated. After the steps S10 and S12, the control routine 122 moves on to a step S14.

In the step S14, a security signal from the transponder 58 is read. For example, as noted above with respect to the operation of the reading devices 94, 96', illustrated in FIGS. 9 and 10, respectively, driver electronics can be activated for causing the communication device, such as the antenna coil forming the communication device 86 illustrated in FIGS. 7 and 8, to emit an interrogation signal. With the transponder 58 signal from the transponder 58 and is thereby excited, thus causing the circuit within the transponder to electronically resonate and transmit a security signal 110. The security signal 110 corresponds to a security code. The reading device 94, 94' can then receive the security signal 110 and convert the security signal to a security code $S_R$. After the security signal 110 is read, the routine 122 moves on to a step S16.

At the step S16, the security code $S_R$ is verified. For example, a security code verifier 96, 96' can be used to compare the security code $S_R$ read in the step S14 with the predetermined authorized security code $S_A$. If the read security $S_R$ equals the predetermined authorized security code $S_A$, the routine 122 moves on to a step S18.

At the step S18, a starter motor for the engine 100 is activated. For example, as noted above with respect to FIG. 9, the engine activator device 98 can be configured to control a starter motor for the engine 100. After the starter motor has been activated, the routine 122 moves on to a step S20.

At the step S20, the engine is started. After the engine is started, the routine 122 moves on to step S22. At the step S22, the starter motor is stopped.

If the security code read at the step S14 does not equal the predetermined authorized security code $S_A$, in step S16, the routine 122 moves on to a step S24.

In the step S24, the starter motor is prevented from being actuated. For example, with reference to the immobilization system 90 illustrated in FIG. 9, the engine activator device 98 can be configured to control a starter motor of the engine 100. In this mode, the engine activator device 98 can be configured to prevent the starter motor of the engine 100 from operating by preventing the flow of electrical energy to the starter motor, for example. After the step S24, the routine 122 moves on to step S26. In the step S26, the routine 122 continues to prevent the starter motor from operating and thus prevents the engine from operating.

With reference to FIG. 12, modification of the control routine 122 is illustrated therein. As shown in FIG. 12, a control routine 124 is initiated after the lanyard member 54 has been engaged (step S30), and after the start switch has been activated at step S32. After the step S32, the control routine moves on to a step S34.

In the step S34, the control routine activates the starter motor. For example, with reference to FIG. 10, as noted above, the engine activator device 98' can control a starter motor on the engine 100. After the starter motor has been activated, the control routine 124 moves on to a step S36.

At the step S36, the engine starts. For example, through the rotation of the engine as caused by the starter motor, and the activation of the ignition system and fuel system, the engine 100 begins to run. After the step S36, the routine 124 moves on to step S38.

At the step S38, the control routine determines when the starter switch has been released. After the starter switch has been released, the routine 124 moves on to a step S40.

At the step S40, the security signal $S_R$ is read. For example, with reference to FIG. 10, the reading device 94' can receive a security signal from the communication device 92 which receives a security signal 110 from the transponder 58. After the security signal $S_R$ is read, the routine 124 moves on to step S24.

At the step S24, it is determined whether the security signal $S_R$ read in the step S40 is a predetermined authorized security code $S_A$. If it is determined that the security signal $S_R$ in the step S40 is a predetermined authorized security code, $S_A$, the routine 124 moves on to a step S44.

At the step S44, the engine ignition system is allowed to remain operational. For example, as disclosed above with reference to FIG. 10, if the security code verifier 96' determines that the security code received from the reading device 94' is a predetermined authorized security code, the security code verifier signals the engine stop device 112 to allow the engine 100 to continue to operate. In one mode, as noted above, the engine stop device can comprise a switch which either allows electrical energy to flow through the ignition system or to ground the ignition system. After the step S44, the routine moves on to a step S46 during which the engine continues to run.

If it is determined, at the step S42, that the security signal read at the step S40 is not equal to a predetermined authorized security code $S_A$, the routine 124 moves on to a step S48.

In the step S48, the engine ignition system is deactivated. For example, as disclosed above with reference to FIG. 10, the engine stop device 112 can be signaled by the security code verifier 96' to deactivate the ignition system. In one mode, the engine stop device 112 can be configured to ground the ignition system of the engine 100, thereby preventing electrical energy from flowing to the ignition system thereof. Following the step S48, the routine 124 moves on to a step S50 in which the engine is killed as a result of the ignition system being terminated in the step S48.

One of ordinary skill in the art can appreciate that the immobilization systems 90, 90' can be in the form of a hardwired circuit, as a dedicated processor having a memory storing computer code for performing the function of the immobilization systems 90, 90' or as computer readable medium read and performed by a general purpose processor. The immobilization systems 90, 90' could be provided as part of an electronic control unit which controls the operation of the engine 100.

Furthermore, the control subroutines 122, 124 could also be manifested as a hardwired control circuit dedicated process having a memory with computer code for performing the routines 122, 124, or a computer readable medium configured to run on a general purpose computer. An electronic control unit for the engine 100 could be configured to perform the control routines 122 to 124 in any of the above-noted modes.

Although this invention has been described in terms of certain preferred embodiments, other embodiments apparent to those of ordinary skill in the art are also within the scope of this invention. Accordingly, the scope of the invention is intended to be defined only by the claims that follow.

What is claimed is:

1. An immobilization system for an engine of a watercraft, comprising a transponder including a security code, a communication device configured to receive a security code from the transponder without direct electrical connection between the transponder and the communication device, and an engine control device configured to prevent the operation of the engine if the security code received by the communication device does not match a predetermined authorized security code.

2. The immobilization system according to claim 1, wherein the transponder is mounted in a lanyard member such that no electrical contacts of the transponder are exposed to an outer surface of the lanyard member.

3. The immobilization system according to claim 1 additionally comprising an engine kill switch, the engine control device activating the engine kill switch if the communication device does not receive the predetermined security code from the transponder.

4. The immobilization system according to claim 1, wherein the engine control device is configured to prevent operation of a starter motor of the motor if the security code received by the communication device does not match a predetermined authorized security code.

5. The immobilization system according to claim 1, wherein the engine control device is configured to store a plurality of predetermined authorized security codes.

6. A lanyard assembly for a watercraft comprising a lanyard member having an outer surface and configured to engage a kill switch device disposed on a watercraft, a tether configured to connect the lanyard member to a user, and a transponder embedded in the lanyard member such that a plurality of electrical contacts of the transponder are not exposed on the outer surface of the lanyard member.

7. The lanyard assembly according to claim 6, additionally comprising a kill switch assembly configured to receive the lanyard member.

8. The lanyard assembly according to claim 6, additionally comprising a communication device configured to receive a signal from the transponder without direct electrical connection to the transponder.

9. The lanyard assembly according to claim 6 wherein the communication device comprises an antenna coil mounted within an engine kill switch assembly mounted to the watercraft.

10. An immobilization system for an engine of a watercraft, comprising a transponder including a security code, a communication device configured to receive a security code from the transponder without direct electrical connection between the transponder and the communication device, and engine control means for preventing the operation of the engine if the security code received by the communication device does not match a predetermined authorized security code.

* * * * *

UNITED STATES PATENT AND TRADEMARK OFFICE
CERTIFICATE OF CORRECTION

PATENT NO.    : 6,352,045 B1
DATED         : March 5, 2002
INVENTOR(S)   : Sumihiro Takashima It is certified that error appears in the above-identified patent and that said Letters Patent is hereby corrected as shown below:

<u>Column 12,</u>
Line 10, please delete "of the motor".

Signed and Sealed this

Fifteenth Day of April, 2003

JAMES E. ROGAN
*Director of the United States Patent and Trademark Office*